United States Patent [19]

Allen

[11] 4,128,385
[45] Dec. 5, 1978

[54] INJECTION MOLDING APPARATUS

[75] Inventor: David O. Allen, Wilmington, Ohio

[73] Assignee: Buckeye Molding Company, New Vienna, Ohio

[21] Appl. No.: 653,105

[22] Filed: Jan. 28, 1976

Related U.S. Application Data

[60] Division of Ser. No. 644,832, Dec. 29, 1975, abandoned, which is a continuation of Ser. No. 483,086, Jun. 26, 1974, abandoned.

[51] Int. Cl.² ............................................. B29F 1/03
[52] U.S. Cl. .................................. 425/549; 425/568; 425/571; 425/DIG. 227
[58] Field of Search ......... 425/247, DIG. 227, 242 R, 425/250, 567, 568, 569, 570, 571, 552, 549; 249/105; 264/329

[56] References Cited

U.S. PATENT DOCUMENTS

| 2,773,284 | 12/1956 | Kelley | 425/DIG. 227 |
| 3,800,027 | 3/1974 | Tsutsumi | 425/243 |
| 3,822,856 | 7/1974 | Gellert | 249/105 |

FOREIGN PATENT DOCUMENTS

| 1951944 | 4/1971 | Fed. Rep. of Germany | 249/105 |
| 996244 | 12/1951 | France | 425/247 |

OTHER PUBLICATIONS

*Modern Plastics Encyclopedia*, 1966 © Sept. 1965, pp. 725 & 726.

Primary Examiner—Francis S. Husar
Assistant Examiner—William R. Briggs
Attorney, Agent, or Firm—Dybvig & Dybvig

[57] ABSTRACT

An improved injection mold apparatus and method includes a gate interposed between a mold chamber or cavity and a runner passageway. The cross sectional opening of the gate is non-circular in shape and may comprise a plurality of foliations. The non-circular shape of gate opening enables the provision of sufficient area to insure adequate filling and compacting of molding material in a mold chamber within a reasonable time interval and also avoids difficult problems such as drooling, stringing, and/or freeze-off or blocking of material-supply passageways.

2 Claims, 3 Drawing Figures

INJECTION MOLDING APPARATUS

This is a division, of application Ser. No. 644,832, filed Dec. 29, 1975, and now abandoned for INJECTION MOLDING APPARATUS AND METHOD, a continuation of application Ser. No. 483,086, filed June 26, 1974 and now abandoned.

BACKGROUND

The present invention relates to injection molding and, more particularly, to an improved method and apparatus for adequately filling and compacting molding material in a mold chamber and at the same time avoiding troublesome and difficult problems such as drooling, stringing, and/or blockage of passageways leading to the mold chamber.

Generally, in an injection molding process, a mold chamber or cavity corresponding to the desired shape of an article to be molded is formed between two mold portions, one of which is movable to allow removal of the article upon completion of the process. After the mold is closed, the molding composition is injected under pressure and in a molten state through a nozzle into a runner network and in turn to individual cavities through sprues and on through connecting passageways or runners and through an opening or gate into the mold cavity or cavities. If a thermoplastic molding composition is used, the phyiscal properties of such composition require that the mold cavity or cavities be cooled in order to solidify the composition before the mold can be opened to remove the molded article and to repeat the molding process. Accordingly, during the molding cycle, it is customary to maintain the cavity-containing portion of the mold cold so that the molding composition will be cooled quickly in the mold chamber or cavity.

During the cooling portion of the cycle, while the mold is open, and until the mold is closed to repeat the molding process, the molding composition in the several passageways leading to the mold chamber or cavity must remain in a molten state and not permitted to freeze since this would thereby prevent further operation of the molding apparatus.

In addition to the aforementioned conflicting requirements, there are additional difficult problems which arise from other conflicting requirements relating to the performance of the gate or orifice that connects the aforesaid passageways with the mold chamber or cavity. If the area of the gate is too restricted, it is difficult to adequately fill and pack the mold chamber or cavity and/or the filling and packing process is excessively time-consuming. On the other hand, if the area of the gate is too large, solidification of the molding composition in the vicinity of the gate is inadequate or incomplete with the result that undesirable drooling and/or stringing of the molding composition occurs when the mold is opened.

Certain prior art improvements such as thermally insulated runners, heated gate probes, and restricted orifice type of gate design allow the use of restricted gates without encountering serious freezing problems, and thereby provide at least a partial solution to some of the above-noted difficult problems. Also, valve gating has met with some degree of success in overcoming drooling and/or stringing problems but valve gating presents an extremely complex design problem and is very expensive to incorporate into a multi-cavity mold.

Accordingly, a principal object of the present invention is to provide improved means and method for obviating the above-noted difficult problems.

SUMMARY

In accordance with the present invention, this is achieved by the provision and utilization of a gate having an irregular shape which enables the provision of adequate gate area and at the same time avoids prior problems such as drooling, and/or stringing, as well as freeze-off or blockage problems.

DESCRIPTION

Additional objects and advantages will become apparent from the following description taken in connection with the accompanying drawings in which.

Figure 1:
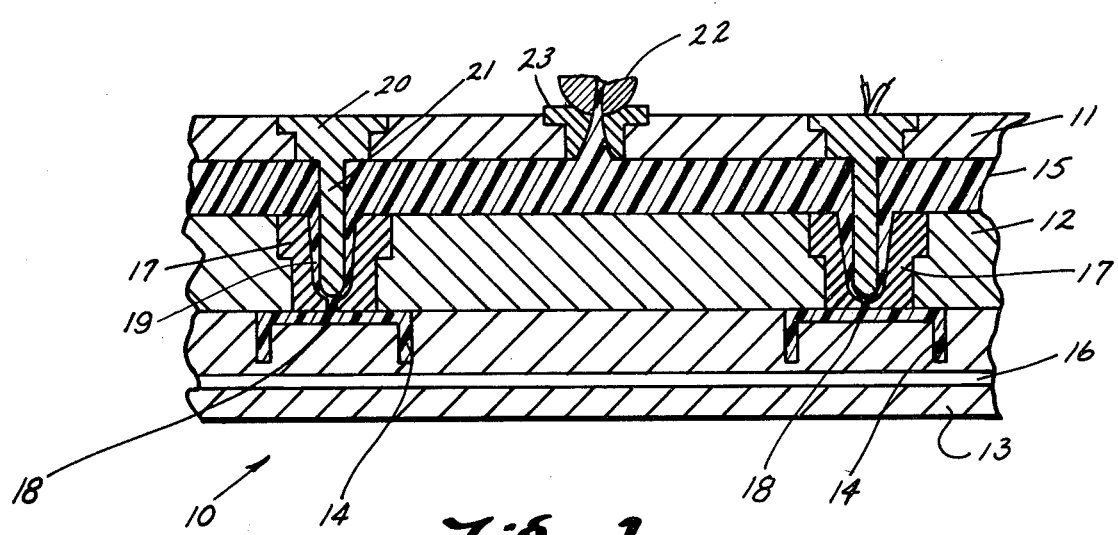
FIG. 1 is a cross-sectional view, partly broken away, illustrating injection molding apparatus embodying the present invention.

In the accompanying drawings, like reference numerals are used throughout the various figures thereof to designate like parts where appropriate. Improved molding apparatus constructed in accordance with the teachings of the present invention is indicated generally by the reference numeral 10.

Apparatus 10 includes a multi-cavity mold comprising a stationary base member 11, an intermediate member 12, and a moveable member 13. Within movable member 13 are formed a plurality of mold chambers or cavities 14 which are opened when the movable member is moved to its open position and which cooperate with the lower surface of intermediate member 12 to form an enclosed cavity when the mold is in the closed position as shown in FIG. 1. Base member 11 and intermediate member 12 are suitably connected together in a known manner to form one or more runner passageways 15, and cooling passageways 16 are provided in member 13.

Intermediate member 12 has mounted therein sprue bushings 17. Bushings 17 are provided with a central bore 19 extending substantially throughout the entire length of the bushing and communicating with the mold cavity 14 by a gate 18.

A heater 20 is fixed to the base member 11 and includes a depending portion 21 extending downwardly into bore 19. The lower distal end of depending portion is suitably shaped and is spaced from the wall surfaces of bushing 17 that define bore 19 to form a continuous annular passageway extending between gate 18 and runner passageway 15. A suitable composition of molding material is injected into the mold by means of injection nozzle 22 and nozzle bushing 23.

When the movable mold portion 13 is in the closed position as shown in FIG. 1, molten molding material is introduced from nozzle 22 through bushing 23 into runner passageway 15 and flows downwardly through the annular sprue passageway that extends around the depending portion 21 of the heater within sprue bushing 17. The molten molding material continues to flow downwardly around the shaped distal end of dependent portion 21 and passes through gate 18 into the mold cavity 14. The plastic molding composition is maintained in a molten state by heater 20 in the sprue passageways immediately adjacent gate 18, and the upper portions of the sprue passageway and the runner passageway are spaced apart from the cooled movable portion 13.

Heretofore, after determining the desired cross-sectional area of the gate opening, the practice was to provide an opening of suitable size of circular configuration. In accordance with the present invention, an opening having the desired cross-sectional area is provided having a multifoliated configuration to insure rapid cooling of the plastic material within the gate itself.

Figure 2:
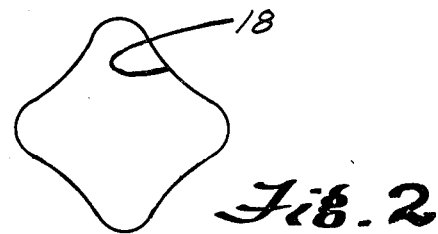
FIG. 2 is a bottom plan view of a gate opening in accordance with the present invention.
Figure 3:
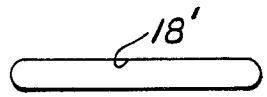
FIG. 3 is a view showing a modification of the opening of FIG. 2.

It is to be understood that the gate opening shown in the drawings is illustrative only and that the invention is not neccessarily limited thereto. In general, gate openings within the scope of the present invention may include multi-foliated configurations within the range of from about two as illustrated at 18′ in FIG. 2 and including about eight foliations. Four foliations forming a gate opening are presently preferred.

In general, the gate opening is non-circular in shape, and the length of the perimeter of the gate is greater than the circumference of a circular opening having a cross-sectional area equal to that of the gate opening.

In operation, with the mold in its closed position, molten thermoplastic material is injected into the mold chambers or cavities 14, the runner passageways 15 and the annular sprue passageway defined by bore 19 and the depending portion 21 of heater 20 and gate opening 18. When the mold chambers 14 are completely filled, the mold remains closed and the molding material within the chambers is rapidly cooled because mold portion 13 is maintained cold by a flow of coolant through passageway 16. Since walls 18 defining the gate opening are closely adjacent mold chambers 14, the molding material within the gate opening is cooled and solidifies almost as rapidly as the material within the mold chambers without encountering freeze-up problems.

While particular embodiments of the invention have been illustrated and described, it will be obvious that various changes and modifications can be made without departing from the invention and it is intended in the appended claims to cover all such changes and modifications that fall within the true spirit and scope of the invention.

I claim:

1. In a molding apparatus of the type wherein resin in a molten state is injected from a sprue passageway and through a gate to fill a mold chamber, said gate having interior wall means defining a gate opening, said apparatus including means for maintaining molten the plastic remaining in said sprue passageway immediately adjacent said gate, the improvements wherein said interior wall means define a gate opening having a periphery exceeding the periphery of a circular opening of the same area, and including cooling means for extracting heat from said gate to cool resin remaining in said gate after filling said mold chamber.

2. The molding apparatus of claim 1 wherein said gate is defined by a one-piece bushing and said means for maintaining molten the plastic remaining in said sprue passageway comprises a heater extending into said bushing.

* * * * *